United States Patent
Matus et al.

(10) Patent No.: US 11,614,369 B2
(45) Date of Patent: Mar. 28, 2023

(54) THERMAL SENSING WIRE AND TECHNIQUES FOR THERMAL SENSING

(71) Applicant: Littelfuse, Inc., Chicago, IL (US)

(72) Inventors: Yuriy Borisovich Matus, Pleasanton, CA (US); Martin G. Pineda, Fremont, CA (US); Sergio Fuentes, Newark, CA (US)

(73) Assignee: Littelfuse, Inc., Chicago, IL (US)

( * ) Notice: Subject to any disclaimer, the term of this patent is extended or adjusted under 35 U.S.C. 154(b) by 611 days.

(21) Appl. No.: 16/686,182

(22) Filed: Nov. 17, 2019

(65) Prior Publication Data

US 2021/0148767 A1 May 20, 2021

(51) Int. Cl.
| | | |
|---|---|---|
| *G01K 7/22* | (2006.01) | |
| *B29C 48/21* | (2019.01) | |
| *B29C 48/05* | (2019.01) | |
| *H01M 10/48* | (2006.01) | |
| *B29L 31/34* | (2006.01) | |

(52) U.S. Cl.
CPC .............. *G01K 7/22* (2013.01); *B29C 48/05* (2019.02); *B29C 48/21* (2019.02); *H01M 10/486* (2013.01); *B29K 2995/0012* (2013.01); *B29L 2031/3468* (2013.01)

(58) Field of Classification Search
CPC .............. H01M 10/486; G01K 7/22; B29K 2995/0012; B29L 2031/3468
See application file for complete search history.

(56) References Cited

U.S. PATENT DOCUMENTS

| 3,435,401 A | 3/1969 | Epstein |
| 5,185,594 A | 2/1993 | DeChurch |
| 2012/0106593 A1* | 5/2012 | Zhou ............... H01M 10/486 324/426 |
| 2012/0299689 A1* | 11/2012 | Wang ............... H05B 1/0269 337/1 |

FOREIGN PATENT DOCUMENTS

| CN | 105809876 | * | 7/2016 |
| DE | 2014017115 A1 | | 5/2012 |
| WO | 2020016853 A1 | | 1/2020 |

OTHER PUBLICATIONS

English translation of CN Publication 105809876, Jul. 2016.*
European Search Report dated Apr. 13, 2021 for corresponding European Patent Application No. 20205285.8.

* cited by examiner

*Primary Examiner* — Brittany L Raymond
(74) *Attorney, Agent, or Firm* — KDB Firm PLLC

(57) ABSTRACT

A thermal sensor wire. The thermal sensor wire may include a thermal sensing portion extending along a wire axis of the thermal sensor wire; and a carrier portion, the carrier portion extending along the wire axis, adjacent to the thermal sensing portion, the thermal sensing portion comprising a polymer positive temperature coefficient (PPTC) material or a negative temperature coefficient (NTC) material.

9 Claims, 4 Drawing Sheets

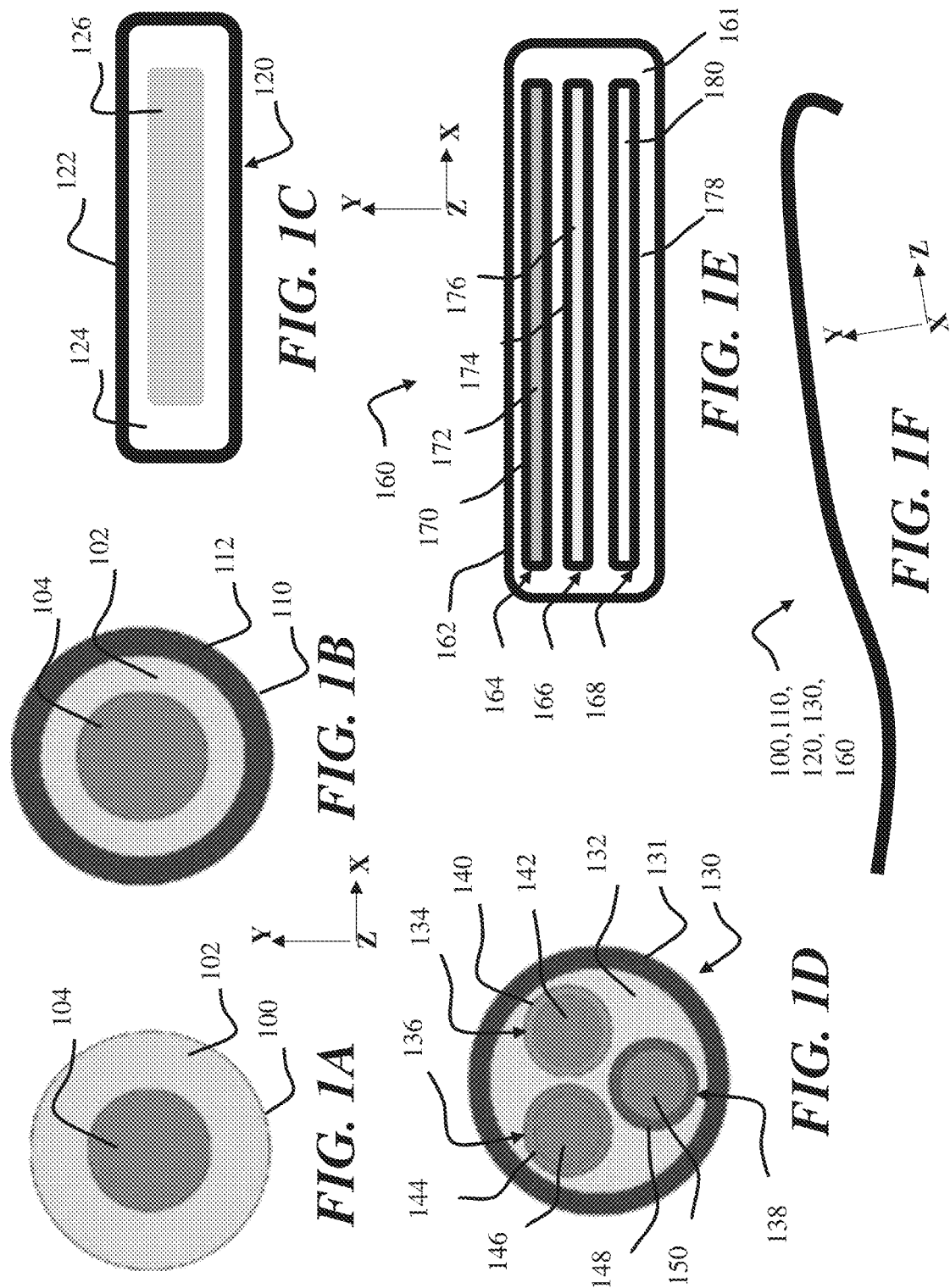

THERMAL SENSING WIRE AND TECHNIQUES FOR THERMAL SENSING

BACKGROUND

Field

Embodiments relate to the field of circuit protection devices, including battery devices.

Discussion of Related Art

Materials such as Polymer positive temperature coefficient (PPTC) devices as well as Negative temperature coefficient (NTC) devices may be used as overcurrent or over-temperature protection device, as well as current or temperature sensors, among various applications. In known configurations, PPTC materials may be placed between a pair of electrodes to limit current, or sense temperature of a component. However, further flexibility in arrangement of PPTC devices and NYC devices will enable new applications or improve control for existing applications.

BRIEF SUMMARY

In one embodiment, a thermal sensor wire is provided. The thermal sensor wire may include a thermal sensing portion extending along a wire axis of the thermal sensor wire; and a carrier portion, the carrier portion extending along the wire axis, adjacent to the thermal sensing portion, the thermal sensing portion comprising a polymer positive temperature coefficient (PPTC) material or a negative temperature coefficient (NTC) material.

In another embodiment, a method for forming a thermal sensor wire is provided. The method may include forming a carrier portion of the thermal sensor wire, elongated along a length of the thermal sensor wire. The method may include forming a thermal sensing material into a thermal sensing portion of the thermal sensor wire, elongated along the length of the thermals sensor wire, and adjacent to the carrier portion. As such, the thermal sensing material may be formed of a polymer positive temperature coefficient (PPTC) material or a negative temperature coefficient (NTC) material, characterized by a thermal transition within a targeted temperature range, wherein the carrier portion comprises a carrier material, not having a thermal transition within the targeted temperature range.

In a further embodiment, a device may include a battery portion, and a thermal sensor wire thermal sensor wire, disposed in contact with the battery portion. The thermal sensor wire may include a thermal sensing portion extending along a wire axis of the thermal sensor wire; and a carrier portion, the carrier portion extending along the wire axis, adjacent to the thermal sensing portion, the thermal sensing portion comprising a polymer positive temperature coefficient (PPTC) material or a negative temperature coefficient (NTC) material.

BRIEF DESCRIPTION OF THE DRAWINGS

FIGS. 1A-1E depict in cross-section various thermal sensor wires, arranged according to different embodiments of the disclosure;

FIG. 1F presents a side view of a thermal sensor wire according to various embodiments;

DESCRIPTION OF EMBODIMENTS

Figure 1G:
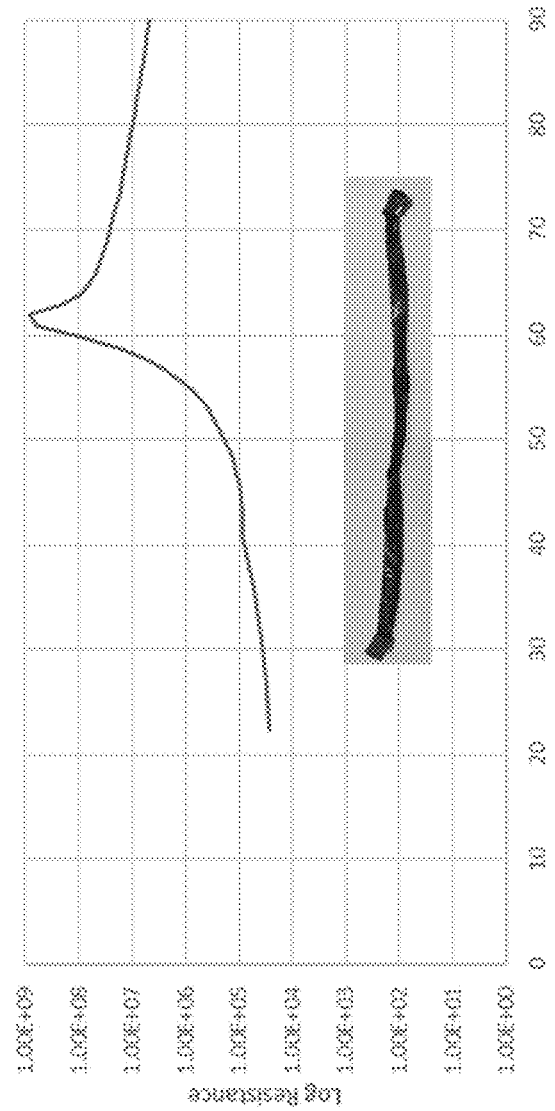
FIG. 1G presents a graph of resistivity as a function of temperature for a PPTC-based thermal sensor wire according to embodiments of the disclosure.

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with one another. Also, the term "on,", "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In various embodiments a thermal indicator "wire" may be used for distributed temperature sensing. The thermal indicator wire, or thermal sensor wire, with temperature sensing elements may be used to sense when a device exceeds a critical temperature. In some examples heat causing an excess temperature may be me generated over a large area while in other embodiments, a temperature sensor may be deployed for detecting hot-spots.

In various embodiments, a polymer positive temperature coefficient (PPTC) or negative temperature coefficient (NTC) material can be used as a part of a thermal sensing wire. In brief the thermal sensing wire, also referred to herein as a "thermal sensor wire," of the present embodiments may be used to indicate when a targeted temperature has been reached or exceeded. The thermal sensing wire may be deployed in contact with a body or device where the temperature may vary, either locally or globally. For a device in question that is protected by the thermal sensing wire, when the temperature meets or exceeds the target temperature, the PPCT material or NTC material of the thermal sensing wire may undergo a transition from high resistance to low resistance, or vice versa. In this manner, an indicator or device coupled to the thermal sensing wire may transform the change in resistance to an alert signal or control signal. Thus, the thermal sensing wire of the present embodiments may be used current embodiment based on 'digital' PPTC thermal indicator that changes resistance from low (normal operation) to high (at a high temperature) impedance PTC and opposite NTC. for over-current and/or over-temperature protection similar to known PPTC devices.

FIGS. 1A-1E depict in cross-section various thermal sensor wires, arranged according to different embodiments of the disclosure. In FIG. 1A there is shown a thermal sensor wire 100, in accordance with some embodiments of the disclosure. The thermal sensor wire 100 may include a thermal sensing portion, extending along a wire axis (Z-axis of the Cartesian coordinate system shown. of the thermal sensor wire 100. Likewise, the thermal sensor wire 100 may include a carrier portion, also extending along the wire axis. As shown in the configuration of FIG. 1, the thermal sensor wire 100 may include an inner core 104, and an outer core 102, disposed circumferentially around the inner core. As such, both the inner core 104 and the outer core 102 may extend along the wire axis. As shown in FIG. 1, the inner core 104 may be shaped as a rod or solid cylinder, while the outer core 102 has a hollow cylinder, or annular shape. In some embodiments the inner core 104 may represent the thermal sensing portion, while the outer core 102 represents the carrier portion. In other embodiments, the inner core 104 may represent the carrier portion, while the outer core represents the thermal sensing portion.

The thermal sensing portion of the thermal sensor wire 100 may be formed of any suitable known PPTC material or known NTC material. Non-limiting examples of PPTC materials include polymers composites having a polymer portion and electrically conductive powder dispersed or interspersed therein, where the polymer portion of the PPTC material may be polyvinylidene fluoride (PVDF), HDPE (high/low density polyethylene), polyurethane, ethylene tetrafluoroethylene (EFTE), PFA (perfluoroalkoxy), or other polymers, such as polymers having crystalline and amorphous phases. Non-limiting examples of NTC materials include oxides based upon Ni, Mn, Fe, and so forth, silicon, etc.

In various embodiments, the carrier portion of a thermal sensor wire may be based upon a polymer material, such as one of the aforementioned polymers used in a PPTC material, without any conductive powder dispersed in the polymer. In other embodiments, the carrier portion of a thermal sensor wire may be based upon a polymer material, such as one of the aforementioned polymers used in a PPTC material, with a dielectric powder dispersed within the polymer. In additional embodiments, the carrier portion of a thermal sensor wire may be based upon other types of polymer material, such as a polyimide, PVC (polyvinyl chloride), acrylic alkyds, such as Rambar, polyimides, or other polymers. In other non-limiting embodiments, the carrier portion may be formed of a carrier material including polymers having a higher temperature (Tg glass transition or Tm melting point than other polymers) or may be a heavier crosslinked polymer. For example, a lower temperature for transition may be used for polymers in a thermal sensing portion may be used in conduction with a high temperature (polycarbonate based) polyurethane or thermally crosslinked polyimide in the carrier portion. The carrier portion may be formed from a higher temperature PET (polyethylene terephthalate) or PCT Poly(cyclohexylenedimethylene terephthalate) mixtures. Other materials suitable for the carrier portion may be could be fibers from ETFE or inorganic fiber glass based fibers, or organic hemp based, metal wire with good pinhole free electrical insulation, nylon, polyester, or other materials.

In various embodiments, the thermal sensing portion may be designed to exhibit a targeted transition temperature, where electrical resistivity changes sharply and substantially. In embodiments employing PPTC material as a thermal sensing material, the increase in resistivity may comprise an order of magnitude increase, three orders of magnitude, five orders of magnitude, seven orders of magnitude, and so forth. In other embodiments where the thermal sensing portion is formed of an NTC material, a sharp decrease in resistivity may take place, such as a decrease by a factor of 5, a factor of 10, a factor of 100, and so forth. The embodiments are not limited in this context. The sharpness of the transition is resistivity may depend upon the nature of the PPTC material or NTC material. However, in some embodiments, the majority of the resistivity change may take place over several degrees, such as five degrees C., or 10 degrees C. In the example of FIG. 1G, a PPTC-based thermal sensor wire exhibits an increase in resistivity of approximately four orders of magnitude (10, 000) over the temperature range of 50° C.-60° C. Thus, the thermal sensor wire may be used as a sensor to indicate when a device or body being protected has reached or exceeded a target temperature of approximately 60° C.

As suggested in FIG. 1F, the thermal sensor wire 100 may have an elongated form as in known wires. The thermal sensor wire 100 and other wires described herein below may exhibit mechanical properties similar to known wires, including plasticity, ability to shape and wrap around a given object. In various non-limiting embodiments, the diameter of the thermal sensor wire 100 or other thermal sensor wires, detailed below, may range from 150 µm to 1 cm.

Figure 2:
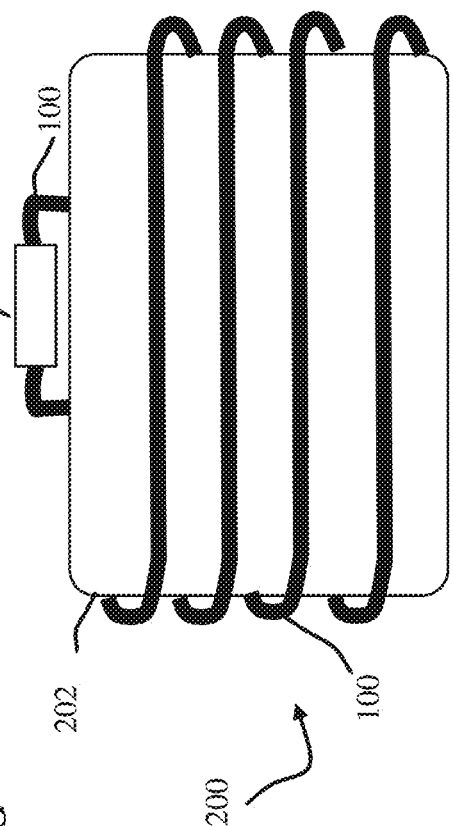
FIG. 2 depicts one implementation of the thermal sensor wire in a device according to embodiments of the disclosure.

Turning to FIG. 2 there is shown one implementation of the thermal sensor wire 100 in a device 200, where the device 200 may include a battery portion 202, in addition to the thermal sensor wire 100. The thermal sensor wire 100 may be wrapped around the battery portion 202, in a manner where many regions of the battery portion 202 are in thermal contact with different parts (segments) of the thermal sensor wire 100. In one embodiment where the thermal sensor wire 100 exhibits a transition temperature of 60 C, when any region or regions of the battery portion 202 develops a hot spot and heats up to sixty degrees of more, a segment or segments of the thermal sensor wire 100 in thermal contact with the hot spot(s) of the battery portion 202 will undergo a sharp and significant change in resistivity, such as described above. As shown in FIG. 2, the thermal sensor wire 100 may be electrically connected to a sensor device 204, representing any suitable circuitry, controller, or indicator, where a large change of resistance in the thermal sensor wire 100 triggers the generation of a suitable control signal or indicator signal. For example, the device 200 may halt operation of the battery portion 202 upon detection of a 60° C. hotspot, or may generate an alert signal, such as an audible or visible signal, or both.

Because the thermal sensor wire 100 may be conveniently placed next to or wrapped around many different regions of a device, such as the battery portion 202, the thermal sensor wire 100, and other similar wires, detailed below, provide a convenient mechanism to probe thermal events occurring anywhere in a device or body, using a simple circuit. Thus, even when the exact position of a thermal event or excursion may not be determined, the thermal sensor wire 100 may readily detect that a local event has occurred somewhere in the body or device to be protected, allowing suitable action to be taken, before excessive or widespread heating may occur.

In the aforementioned embodiment of FIG. 1A, just an inner core 104 and outer core 102 are shown. However, in additional embodiments, a thermal sensor wire may include a wire coating, disposed around the outer core. FIG. 1B illustrates an embodiment of a thermal sensor wire 110, including a wire coating 112, disposed around the outer core 102. In various non-limiting embodiments, the wire coating 112 may be formed of an insulator such as a same base polymer as used in the thermal sensing portion, without any conductive phase added; may be formed of an insulator such as a same base polymer as used in the thermal sensing portion, with dielectric material filler; of an insulator such as a same base polymer as used in the thermal sensing portion, with the addition of another polymer that raises TG, or increases crosslinking, Examples of additional polymer materials that may be added to a base PPTC material for form the insulator coating include polycarbonates, PVC, polyimide, PTFE, or other known polymers.

Figure 3:
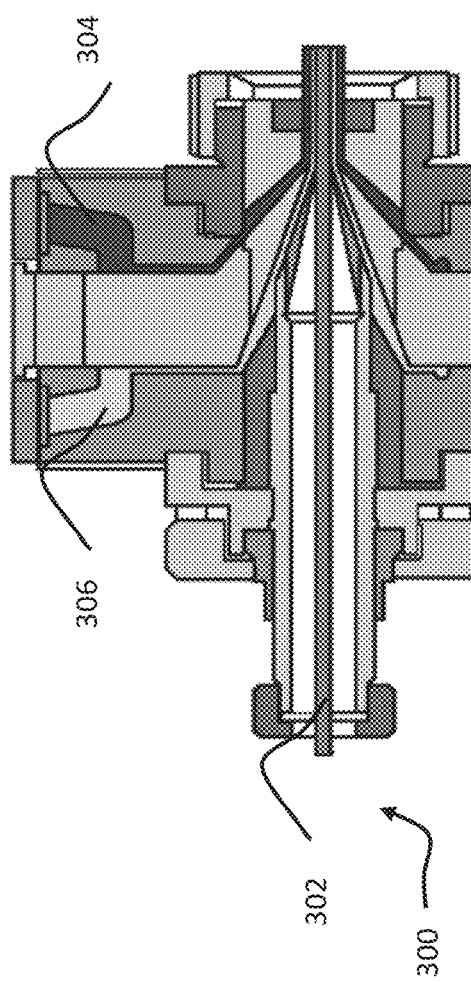
FIG. 3 illustrates an embodiment of an apparatus, for forming thermal sensor wires.

In some embodiments, the wire coating 112 or similar wire coatings may be specifically arranged to convey information regarding the contents of the outer core 102 or inner core 104, as detailed below with respect to FIG. 4. FIG. 3 illustrates an embodiment of an apparatus 300, for forming thermal sensor wires, such as a the thermal sensor wire 110. The apparatus 300 may represent an extrusion apparatus, having a central orifice 302, where the inner core 104 is drawn or extruded through, a second orifice 304 for feeding the outer core 102 to form around the inner core 104, and a third orifice 306 for feeding the wire coating 112 around the outer core 102.

FIG. 1C shows an embodiment of a thermal sensor wire 120, where the cross-section is rectangular, rather than round or circular. As such, an inner core 126 may be rectangular shaped, while the outer core 124 has a rectangular cylindrical shape, and is surrounded by a wire coating 122. Depending upon the application, the use of the rectangular, flat, or elongated cross-section of the thermal sensor wire 120 may be more appropriate than a circular-cross-section wire.

FIG. 1D illustrates an embodiment of a thermal sensor wire 130, having a round cross-section or circular cross-section, and an outer wire coating 131, disposed around a carrier portion 132. In this embodiment, a plurality of inner wires are disposed within the carrier portion 132. These wires are shown as first inner wire 134, second inner wire 136, and third inner wire 138. In various embodiments, these inner wires may differ from one another in thermal properties. For example, the first inner wire 134 may be formed using a first thermal sensing material 142 characterized by a first transition temperature, the second inner wire 136 may be formed using a second thermal sensing material 146 characterized by a second transition temperature, while the third inner wire 138 may be formed using a third thermal sensing material 150 characterized by a third transition temperature. All these transition temperatures may differ from one another. As such, the thermal sensor wire 130 may be suitable for use where sensing of temperature is useful at multiple different temperatures for a device to be protected. For example, the first transition temperature may be 60 C, the second transition temperature may be 70 C, while the third transition temperature may be 80° C. Each of the inner wires may be separately coupled to circuitry or devices to indicate when a given temperature has been reached. In the case of protecting a battery, when 60° C. is exceeded at a given location on a battery, the first inner wire 134, undergoing a sharp change in resistance, may trigger a first warning signal to be sent. When 70° C. is exceeded, the second inner wire 136 may trigger a second signal, such as a higher level alarm, while when 80° C. is exceeded, the third inner wire 138 may trigger a procedure, such as a shutdown of power.

While FIG. 1D illustrates an embodiment of three inner wires, in other embodiments fewer or more inner wires may be used to form a multi-temperature sensor wire. Notably, for ease of assembly and wiring, the inner coating 140, inner coating 144, and inner coating 148, of the respective inner wires, may differ from one another, such as in color.

FIG. 1E illustrates an embodiment of a thermal sensor wire 160, having a flat, elongated or rectangular cross-section, and an outer wire coating 162, disposed around a carrier portion 161. In this embodiment, like FIG. 1D, a plurality of inner wires are disposed within the carrier portion 161. These wires are shown as first inner wire 164, second inner wire 166, and third inner wire 168. In various embodiments, these inner wires may differ from one another in thermal properties. For example, the first inner wire 164 may be formed using a first thermal sensing material 172 (surrounded by inner coating 170) characterized by a first transition temperature, the second inner wire 166 may be formed using a second thermal sensing material 176 (surrounded by inner coating 174) characterized by a second transition temperature, while the third inner wire 168 may be formed using a third thermal sensing material 180 (surrounded by coating 170) characterized by a third transition temperature. All these transition temperatures may differ from one another. As such, the thermal sensor wire 160 may be suitable for use where sensing of temperature is useful at multiple different temperatures for a device to be protected, as in the case of the thermal sensor wire 130, discussed above.

Figure 4:
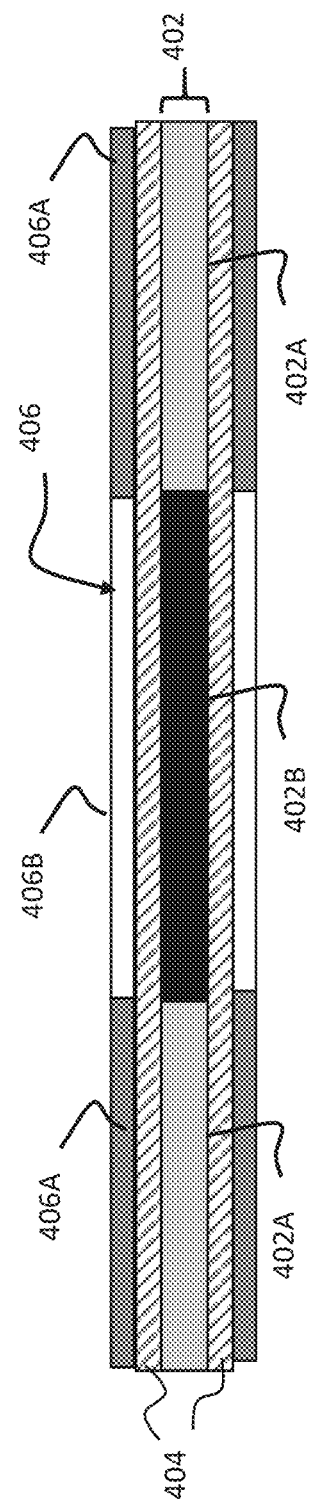
FIG. 4 depicts a thermal sensor wire, according to further embodiments of the disclosure.

FIG. 4 depicts a thermal sensor wire 400, according to further embodiments of the disclosure. The thermal sensor wire 400 includes an inner core 402, an outer core 404, disposed around the inner core 402, and a wire coating 406, disposed around the outer core 404. The inner core 402 may be segmented as shown, in that the inner core 402 comprises a first core segment 402A and a second core segment 402B, disposed longitudinally with respect to one another along the wire axis (z-axis), wherein the first core segment 402A comprises thermal sensing material that has a transition temperature where electrical conductivity changes by at least one order of magnitude within a targeted temperature range. As such, the first core segment 402A may include a PPTC material or an NTC material, for example. In contrast, the second core segment 402B does not exhibit a transition temperature within the targeted temperature range. For example, the thermal sensor wire 400 may be designed to detect temperature excursions above approximately 80 C, so the material of the first core segment 402A may be designed to have a transition temperature in the range somewhere between 70° C. to 80° C. or so.

The inner core 402 may be generally electrically conductive, including the second core segment 402B, so when a transition takes place at 80° C. in the first core segment 402A, the overall resistance and resistance change of the inner core 402 may be readily measurable. In various embodiments, the first core segment 402A may be repeated multiple times along the inner core 402 as shown in FIG. 4. For example, the thermal sensor wire 400 may be applied to a battery pack where a plurality of first core segments 402A are applied to the surface of battery regions to monitor temperature. Moreover, the second core segment 402B may include a simple conductor, such as carbon black, that does not exhibit a transition temperature where electrical conductivity changes by an order of magnitude or more within several degrees (at least not within the targeted temperature range to be monitored). Thus, the second core segment 402B may be arranged next to regions where temperature is not to be monitored, such as gaps between batteries, edges, and so forth. In this manner, PPTC material or NTC material need not be supplied throughout the entirety of the inner core 402, but just in select segments that can be selectively arranged adjacent to device regions to be monitored.

As further shown in FIG. 4, the wire coating 406 comprises a first coating segment 406A, disposed around the first core segment 402A, and a second coating segment 406B, disposed around the second core segment 402B, wherein the first coating segment 406A has a first color, and the second core segment 406B has a second color, different from the first color. In this manner, the thermal sensor wire 400 provides an indication of the location of thermal sensing portions (first core segments 402A) along the length, facilitating appropriate application of the thermal sensing portions of the thermal sensor wire 400 to the portions of the device to be monitored or protected.

According to various embodiments thermal sensor wires may be formed by any suitable technique, including extrusion of a PTC material as a single wire, where the cross-section is controlled by various dies from round to rectangular; coextrusion of multiple layers to form a multilayer wire configuration with different functional properties where some layers are conductive an others are not conductive; extruded with a variable cross-section along the length of a wire; laminated/calendered segments from multiple "wires" with periodically different length segments along the length performed into roll to roll or a batch process; hot melt pressed or printed and re-laminated. In some embodiments, an inner core portion that forms a thermal sensing portion of a thermal sensor wire may be extruded at a constant diameter. In some embodiments, the inner core portion may be extruded to generate a variable diameter in the inner core portion. For example, the overall resistance of the wire may be maintained at an acceptable level by having a first diameter of the inner core portion over certain lengths of the wire, while the diameter may be changed at certain points to a second diameter that is less. For example, the diameter of the (conductive) inner core portion may be established at a first value along segments of the wire where no thermal sensing is to take place, and may be a second value along segments where thermal sensing is to be performed.

Figure 5:
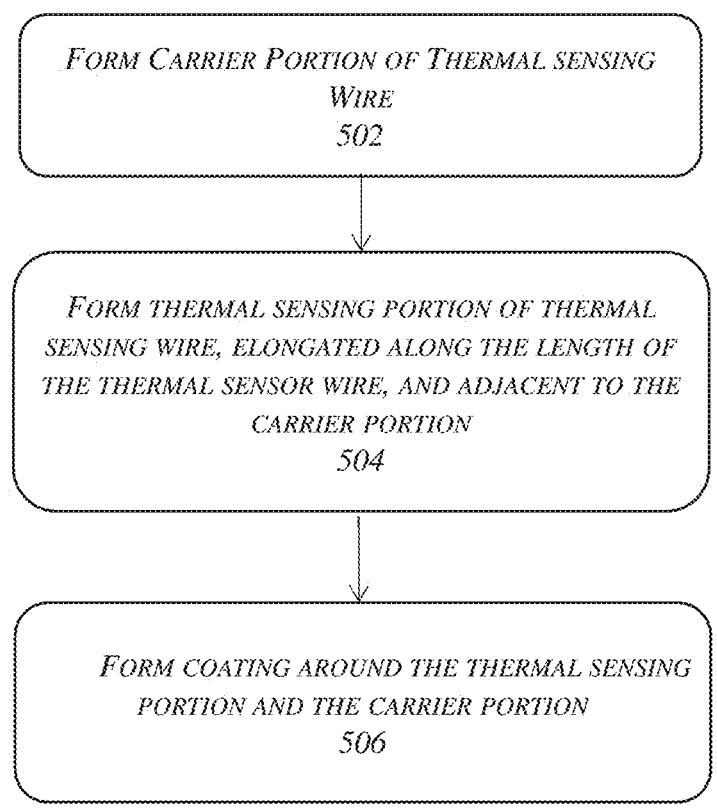
FIG. 5 depicts a process flow according to other embodiments of the disclosure.

Turning now to FIG. 5 there is shown an exemplary process flow 500. At block 502, a carrier portion of a thermal sensor wire is formed. The carrier portion may extend along a long axis of the thermal sensor wire.

At block 504, a thermal sensing material is formed into a thermal sensing portion of the thermal sensor wire, where the thermal sensing portion is elongated along the length of the thermal sensor wire, and adjacent to the carrier portion. In some embodiments, the thermal sensing portion may be formed as a core portion, disposed within the carrier portion, while in other embodiments, the carrier portion may be formed as the core portion, within a thermal sensing portion.

The thermal sensing material may include a polymer positive temperature coefficient (PPTC) material or a negative temperature coefficient (NTC) material in different embodiments. The thermal sensing material may be characterized by a thermal transition within a targeted temperature range. For example, a thermal transition may involve an increase or decrease in resistance by one order of magnitude, two orders or magnitude, four orders of magnitude, and so forth, within a narrow temperature range, such as within several degrees C. The targeted range for the thermal transition may be arranged according to application, but may generally lie within a range of −50° C. to 200° C. according to various non-limiting embodiments. Contrariwise, the carrier portion may be formed of a carrier material, not having a thermal transition within the targeted temperature range, meaning the resistance does not change abruptly, such as by a factor of 10 (one order of magnitude) or more over a narrow temperature range, such as several degrees C., within the targeted temperature range. Thus, the thermal sensor wire may exhibit a sharp resistance change due just to a thermal transition experienced by the thermal sensing material within a targeted temperature range.

In some embodiments, the thermal sensing portion may be formed into a plurality of different inner wires, where each inner wire includes a thermal sensing material having a given transition temperature. For example, three different inner wires may be formed using three different thermal sensing materials, having three different transition temperatures. The three different inner wires may be coated with different respective coatings for the purpose of identification, and may be disposed in a common carrier portion of a thermal sensing wire that includes a general coating, disposed around the carrier portion.

At block 506, a coating is formed around the thermal sensing portion and the carrier portion. In various embodiments, the coating may be an electrical insulator as in known wire coatings.

In some embodiments, the thermal sensing portion may be formed into a plurality of different inner wires, where each inner wire includes a thermal sensing material having a given transition temperature. For example, three different inner wires may be formed using three different thermal sensing materials, having three different transition temperatures. The three different inner wires may be coated with different respective coatings for the purpose of identification, and may be disposed in a common carrier portion of a thermal sensing wire that includes a general coating, disposed around the carrier portion.

In summary, the present embodiments may be used for over-current and/or over-temperature protection similar to standard PPTC devices. In various embodiments a thermal sensor wire may be arranged as a sensing element as a continuous PPTC structure; or in multiple temperature sensing areas in series and/or parallel electrical configurations. Digital elements may be placed in series where resistance/impedance is low during normal operation, and is high when an anomalous condition allows for use of a simple digital signal that can be detected by a microprocessor or used to drive a electrical switch such as a relay or a field effect transistor.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments are not to be limited to the described embodiments, and may have the full scope defined by the language of the following claims, and equivalents thereof.

What is claimed is:

1. A thermal sensor wire, comprising:
a thermal sensing portion extending along a wire axis of the thermal sensor wire; and
a carrier portion, the carrier portion extending along the wire axis, adjacent to the thermal sensing portion, the thermal sensing portion comprising a polymer positive temperature coefficient (PPTC) material or a negative temperature coefficient (NTC) material and having a variable cross-section along a length of the thermal sensor wire.

2. The thermal sensor wire of claim 1, comprising a round cross-section or a rectangular cross-section.

3. The thermal sensor wire of claim 1, comprising a plurality of layers having different functional properties, wherein the thermal sensing portion comprises a first layer that is electrically conductive, and wherein a second layer is electrically insulating.

4. The thermal sensor wire of claim 1, the thermal sensing portion comprising:
an inner core, the carrier portion disposed circumferentially around the inner core; and, a wire coating, disposed around the carrier portion.

5. The thermal sensor wire of claim 4, wherein the inner core comprises a first core segment and a second core segment, disposed longitudinally with respect to one another along the wire axis, wherein the first core segment comprises a transition temperature where electrical conductivity changes by at least one order of magnitude within a targeted temperature range, wherein the second core segment does not exhibit a transition temperature within the targeted temperature range.

6. The thermal sensor wire of claim 5, wherein the wire coating comprises a first coating segment, disposed around the first core segment, and a second coating segment, disposed around the second core segment, wherein the first coating segment has a first color, and the second core segment has a second color, different from the first color.

7. The thermal sensor wire of claim 1, further comprising: an outer wire coating, disposed around the carrier portion; and a plurality of inner wires, disposed within the carrier portion, wherein the thermal sensing portion is disposed in a first inner wire of the plurality of inner wires, and comprises a first thermal sensing material, having a first transition temperature, wherein the plurality of inner wires comprises at least one additional wire, comprising a second thermal sensing material, having a second transition temperature, different from the first transition temperature.

8. A device, comprising:
a battery portion; and
a thermal sensor wire, disposed in contact with the battery portion, wherein the thermal sensor wire comprises:
a thermal sensing portion extending along a wire axis of the thermal sensor wire; and
a carrier portion, the carrier portion extending along the wire axis, adjacent to the thermal sensing portion, the thermal sensing portion comprising a polymer positive temperature coefficient (PPTC) material or a negative temperature coefficient (NTC) material and having a variable cross-section along a length of the thermal sensor wire.

9. The battery of claim 8, the thermal sensing portion comprising an inner core, the carrier portion disposed circumferentially around the inner core; and, a wire coating, disposed around the carrier portion.

* * * * *